United States Patent [19]

Hansen

[11] Patent Number: 4,883,004
[45] Date of Patent: Nov. 28, 1989

[54] METHOD FOR INHIBITING CORROSION IN INTEGRATED SPRAY DRYING-CALCINING PROCESS

[75] Inventor: Ove Hansen, Columbia, Md.
[73] Assignee: Niro Atomizer Inc., Columbia, Md.
[21] Appl. No.: 238,422
[22] Filed: Aug. 31, 1988
[51] Int. Cl.$^4$ ................................................ F23J 1/00
[52] U.S. Cl. .................................... 110/343; 110/345; 432/72
[58] Field of Search .................... 110/343, 345; 98/45, 98/46; 432/72

[56] References Cited

U.S. PATENT DOCUMENTS

| | | | |
|---|---|---|---|
| 3,776,688 | 12/1973 | Damgaard-Iversen et al. | 423/14 |
| 4,149,453 | 4/1979 | Reed | 98/46 |
| 4,542,704 | 9/1985 | Brown et al. | 110/345 |
| 4,702,899 | 10/1987 | Benczak et al. | 110/343 |
| 4,717,559 | 1/1988 | Cummings et al. | 423/328 |
| 4,720,262 | 1/1988 | Durr et al. | 432/106 |
| 4,771,712 | 9/1988 | Engstrom et al. | 110/343 |

*Primary Examiner*—Henry C. Yuen
*Attorney, Agent, or Firm*—Armstrong, Nikaido, Marmelstein, Kubovcik & Murray

[57] ABSTRACT

Corrosion and sulfuric acid formation in an integrated spray-drying and calcining operation is inhibited by operating the calciner at a temperature so that the exit gases from the calciner provides sufficient heat to the spray drier to keep the exit gases from the spray drier at a temperature above the dew point of the $SO_3/H_2O$ vapors present in the spray drier exit gas.

4 Claims, 3 Drawing Sheets

METHOD FOR INHIBITING CORROSION IN INTEGRATED SPRAY DRYING-CALCINING PROCESS

BACKGROUND OF THE INVENTION

1. FIELD OF THE INVENTION

This invention relates to an improvement in an integrated spray drying and calcining process, particularly for kaolin, wherein hot exit gases from the calciner are used as a heat source for the spray dryer. In one specific aspect, it relates to a method for inhibiting corrosion of the equipment utilized in such a process.

Kaolin clay was one of the first inorganic materials to be dried commercially on a large scale using spray dryers. To prepare pure kaolin for the paper, paint, plastics, rubber and ceramic industries, crude kaolin from the mine is milled, crushed and slurried with water and chemical dispersants, and a fine clay slip containing about 25% solids is then separated. The slip is flocculated with sulfuric acid and further chemically treated to improve quality, centrifuged and filtered to obtain a slurry having a solids content suitable for spray drying. During spray drying of the slurry, heated air at a temperature of about 600° C. is fed the spray drier, and gases at about 100°–120° C. exit the spray drier. The dried kaolin leaving the spray drier is at about 90°–110° C. and contains less than 1% free moisture and about 14% crystal bound water.

The kaolin from the spray drier is then passed to a calciner and calcined. The calcined kaolin leaving the calciner is at a temperature in the range of 865°–1100° C. and the gases exiting the calciner are at about 600° C. Those exit gases are generally treated to recover particulates and to remove environmentally hazardous materials, including acid-forming gases, before being released to the atmosphere. Separate sources of fuel are generally used to supply heat to the calciner and to the spray dryer in kaolin processing operations.

2. Discussion of the Prior Art

It is known to utilize calciner off-gases to supply heat to a spray dryer. For example, U.S. Pat. No. 3,776,688 describes the operation of a rotating kiln plant for producing cement according to the wet process. The capacity of the kiln is increased and heat economy is improved by drying a part of the cement slurry in the spray dryer and introducing the spray dried material into the kiln. The spray drying is performed using exhaust gases from the kiln in an integrated operation.

U.S. Pat. No. 4,717,559 describes a method for producing a calcined kaolin pigment by feeding an aqueous slurry of kaolin to a spray dryer which is supplied with heat by means of the exit gases from the calciner mixed with heated air provided by a combustor. The method recovers both heat energy and calciner dust from the calciner exhaust gases. The exhaust gases from the calciner are described in a preferred embodiment as being in the range of 800° F. (427° C.) to 1000° F. (538° C.), preferably at about 1000° F. (538° C.). A gas inlet temperature to the spray dryer of 1100° F. (593° C.) and a outlet temperature of 200° F. (93° C.) are exemplified.

When processing kaolin in an integrated spray drying and calcining process, the slurry being fed to the spray dryer usually contains a variety of sulfur-containing entities, including aluminum sulfate, sulfonated dispersants and various acid moieties. Sulfur-containing entities are also present in the spray dryer solid product being fed to the calciner. During calcination, certain of the sulfur-containing entities decompose to form various gaseous products, including sulfur trioxide. That sulfur trioxide, in the presence of water vapor under ordinary conditions of operation, forms liquid sulfuric acid. As is well known, sulfuric acid is highly corrosive, particularly at elevated temperatures.

OBJECT OF THE INVENTION

It is an object of the present invention to provide an improved integrated spray drying and calcining process operation wherein the formation of corrosive condensates in the process equipment is avoided or minimized.

It is a further object of the invention to provide an integrated spray drying and calcining process wherein the exhaust gas from the calciner is the sole source of heat for the spray drying operation.

SUMMARY OF THE INVENTION

It has been discovered that the above and other desirable objects of the invention can be achieved by operating the calciner and the spray dryer under conditions whereby sulfuric acid and the like are not formed within the calciner and/or the spray drier, and acid-forming moieties, particularly sulfur oxides, exit the integrated operation as part of the spray dryer exit gases.

Thus, the present invention is a method for inhibiting corrosion in an integrated spray drying and calcining process wherein the hot exit gases from the calciner are used as the heat source for the spray drier, which comprises controlling the temperature of the calciner and the air flow through the calciner so that the exit gases from the spray drier are at a temperature above the dew point of the $SO_3/H_2O$ vapors in the spray drier exit gases.

DETAILED DESCRIPTION OF THE INVENTION

Figure 1:
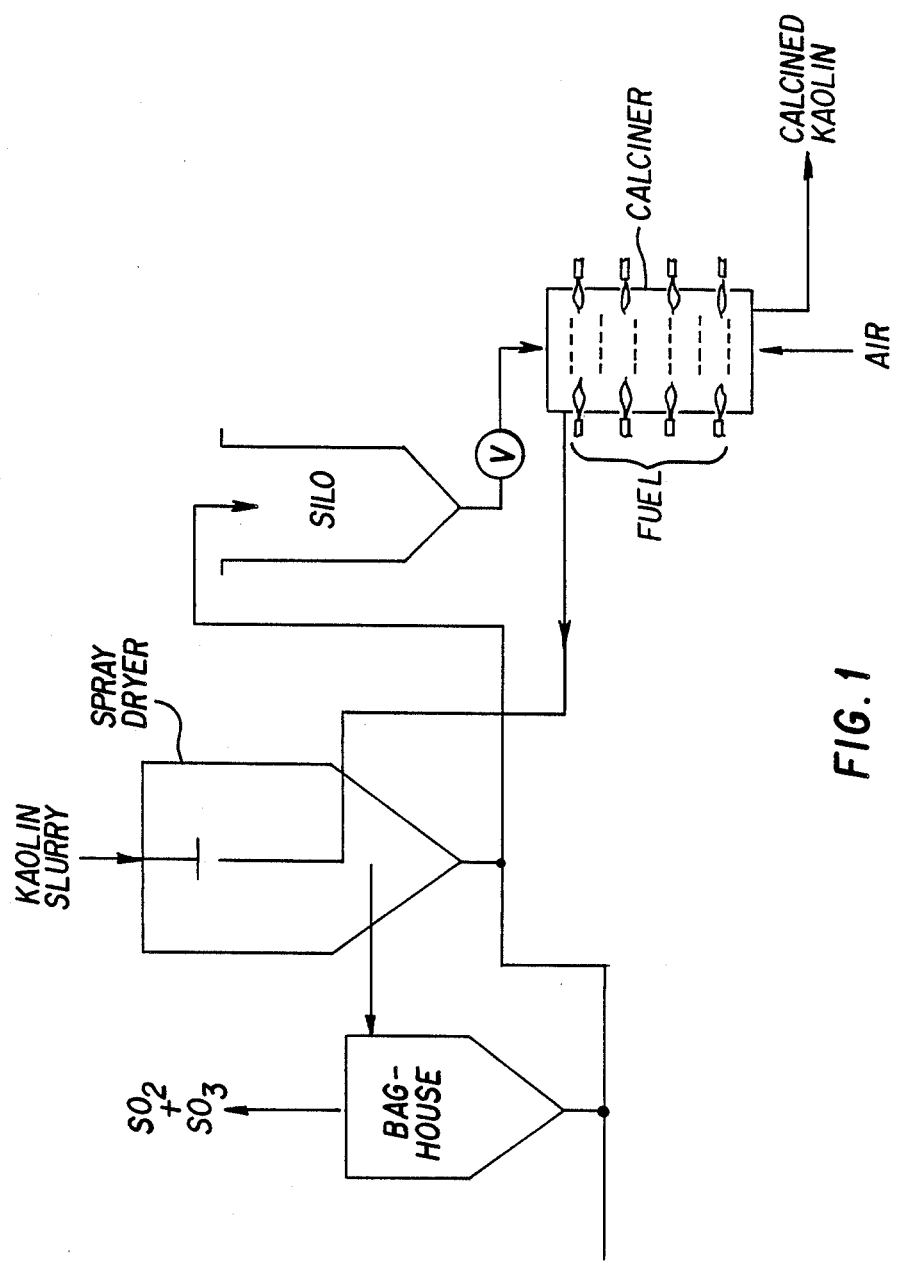
FIG. 1 is a flow sheet illustrating an integrated spray drying-calcining process according to the present invention.

The overall operation of an integrated spray-drying-calcining operation for kaolin is illustrated in FIG. 1. Using conventional equipment, a kaolin slurry is fed to a spray drier where it is dried by contact with hot exhaust gases from the calciner. The hot exit gases from the spray drier are passed to a bag house where dust particles are separated and mixed with the kaolin to be fed to the calciner. The gases exiting from the bag house contain $SO_2$ and a lesser amount of $SO_3$.

The dried product from the spray dryer together with the particles from the bag house are passed to a silo for feeding to the calciner. The kaolin is calcined at a temperature higher than that customarily utilized and the air flow through the calciner is controlled so that the exit gases from the calciner are at a temperature of 700°–800° C., sufficient without auxiliary heating to provide a gas temperature in the spray drier of at least 150° C., preferably 150°–200° C.

It has been discovered that by operating the spray drier at a temperature of 150°-200° C., and well above the dew point of the $SO_3/H_2O$ vapors present, no sulfuric acid is formed in the spray drier. To achieve a gas temperature in that range in the spray drier, it is necessary, under balanced operating conditions, that the heating gas supplied to the spray drier be at a temperature in the range of 700°-800°C. The temperature of the exit gases from the calciner used as the heat source for the spray drier is controlled both by the amount of heat supplied to the calciner, in practice the amount of fuel combusted, and by the amount of air being passed through the calciner.

Figure 2:
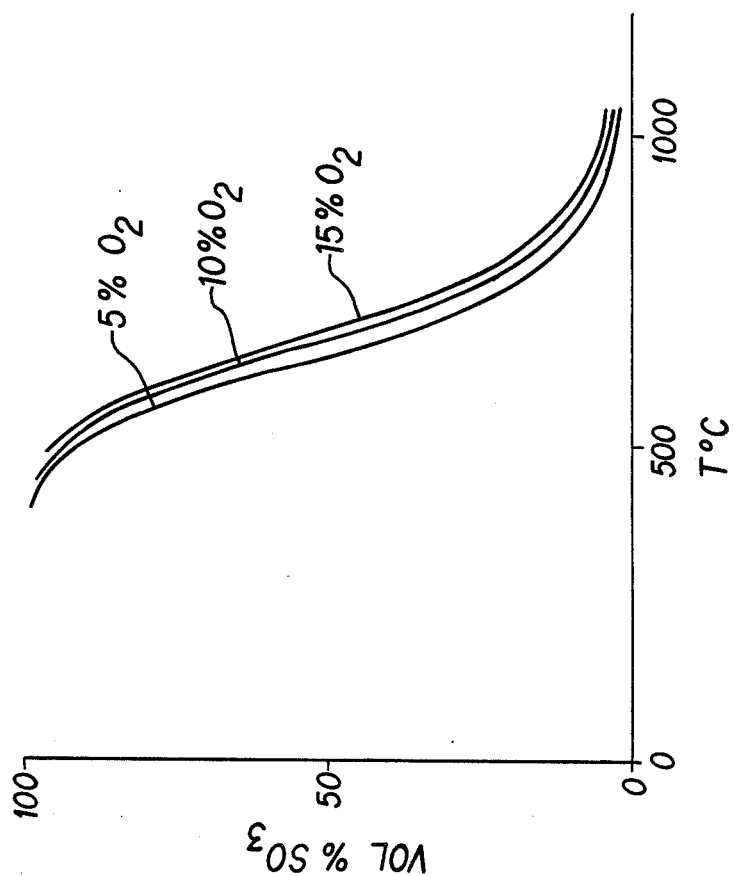
FIG. 2 is a graph illustrating the equilibrium relationship between $SO_3$, $SO_2$ and $O_2$ as a function of temperature at 15, 10 and 5 volume percent oxygen.

As illustrated in FIG. 2, the equilibrium reaction $SO_3 \rightleftharpoons SO_2 + \frac{1}{2}O_2$ is very temperature sensitive in the temperature range of 500°-1000° C. As the temperature is raised, the equilibrium shifts to $SO_2$ and the concentration of $SO_3$ in the system and in the exit gases from the bag house is lowered. This represents an additional advantage of operating at higher temperatures than those customarily utilized.

The method of invention is further illustrated by means of the following non-limiting examples:

Using a process as illustrated in FIG. 1 and as described above, an experiment was carried out wherein the gases exiting from the calciner were at temperature of 685° C. and the gases exiting from the spray dryer were at 110° C. As the experiment continued, it was observed that the $SO_3$ content of the calciner exit gases rose to 126 ppm corresponding to a sulfuric acid dew point of about 165° C. The gas exiting from the spray dryer contained 5 ppm of $SO_3$ and had a dew point of 145° C. and at 110° C. was clearly below the dew point for the $SO_3/H_2O$ vapors present. It was apparent that continuous operation under these process conditions would result in severe corrosion of the process equipment.

In another experiment, the temperature of the calciner exit gases was maintained at 720° C. and the gases exiting from the spray dryer were at 160° C. Under these conditions, the $SO_3$ content of the calciner exit gases reached a steady equilibrium value corresponding to a 65% conversion of $SO_3$ to $SO_2$ in the calciner and a 52% absorption on the spray dried kaolin of the $SO_3$ entering the spray drier. The other 48% of the $SO_3$ and all of the $SO_2$ entering the spray dryer exited the system via the bag house as part of the spray dryer exit gas. The $SO_3/H_2O$ dew point in the exit gas was 158° C., which is just above the calculated value for the dew point. There was no evidence of the presence of corrosive materials in the spray dryer and the other gas handling equipment.

In the next experiment, the exit gas from the calciner was at a temperature of 745° C. and the gas exiting the spray dryer was at a temperature of 200° C. The temperature in the spray drier and the temperature of the gases exiting the spray drier was well above the dew point for sulfuric acid, and no corrosion of the process equipment was observed.

The table below is taken from a computerized printout summarizing the process parameters and heat and mass transfer balances in the three experiments described above. The amount of materials being fed to the spray drier and to the calciner were kept constant in each experiment. Air flow and amount of fuel used were the only parameters changed in these examples to vary the temperature of the exit gases from the calciner.

|  | EXP 1 | | EXP 2 | | EXP 3 | |
| --- | --- | --- | --- | --- | --- | --- |
|  | Calciner | Drier | Calciner | Drier | Calciner | Drier |
| Feed rate dry solids, kg/h | 6802 | 8002 | 6802 | 8002 | 6802 | 8002 |
| Feed temp., °C. | 25 | 15 | 25 | 15 | 25 | 15 |
| % solids in feed | 84.5 | 55.0 | 84.5 | 55.0 | 84.5 | 55.0 |
| Powder out wet, kgs/h | 6802 | 8082 | 6802 | 8082 | 6802 | 8082 |
| Powder out wet, lbs/h | 14998 | 17822 | 14998 | 17822 | 14998 | 17822 |
| Feed rate, wet, kgs/h | 8049 | 14549 | 8049 | 14549 | 8049 | 14549 |
| Powder temp, °C. | 865 | 100 | 865 | 140 | 865 | 175 |
| Air inlet temp, °C. | 1086 | 685 | 1086 | 720 | 1086 | 745 |
| Air outlet temp, °C. | 685 | 110 | 720 | 160 | 745 | 200 |
| Air flow inlet act. T m3/h | 101063 | 77817 | 112395 | 87428 | 121986 | 96120 |
| Air flow inlet act. T ACFM | 59366 | 45711 | 66023 | 51357 | 71657 | 56463 |
| Air flow inlet 20 °C. SCFM | 12799 | 13980 | 14234 | 15153 | 15449 | 16251 |
| Evaporation, kg/h | 1247 | 6466 | 1247 | 6466 | 1247 | 6466 |
| Dry gas rate kg/h | 23826 | 24248 | 26498 | 26469 | 28759 | 28527 |
| Dry gas, kg/h | 24303 | 24733 | 27028 | 26999 | 29335 | 29098 |
| Air flow out vol, m3/h | 77997 | 42931 | 89278 | 51542 | 98843 | 59375 |
| Air flow out act. temp. ACFM | 45817 | 25218 | 52444 | 30277 | 58062 | 34878 |
| Air flow out 20 °C., SCFM | 14013 | 19292 | 15474 | 20487 | 16711 | 21605 |

In the conduct of this work, it was found that, when utilizing calciner exhaust gases containing $SO_3$ as the heat source for operating a spray dryer, a relationship exits between the temperature of the exit gases from the calciner, the dew point of $S_3/H_2O$ vapors in the spray dryer, and the exit gases from the spray drier. Understanding this relationship permits operating an integrated spray drying and calcining process in such a manner as to eliminate or at least minimize corrosion problems. Depending on the amount of $SO_3$ produced per unit weight of kaolin calcined, there is a temperature for the exit gases from the spray drier, which is taken as the lowest gas temperature in the spray drier, which is equivalent to the $S_3/H_2O$ dew point of that exit gas. Maintaining the gas temperature of the gases in the spray drier at a temperature above that dew point prevents the formation of sulfuric acid within the spray drier and related process equipment.

For example, when kaolin containing 0.79, 1.57 and 3.14 kg of $SO_3$ per ton of kaolin is being fed to the calciner, the temperature of the exit gases from the spray drier should be maintained at least above 148° C., 153° C. and 160° C., respectively, in order to prevent the formation of sulfuric acid. As explained earlier, increasing the temperature of operation has the added advantage of reducing the amount of $SO_3$ in the system by converting it to $SO_2$, effectively lowering the $SO_3/H_2O$ dew point in the system.

Figure 3:
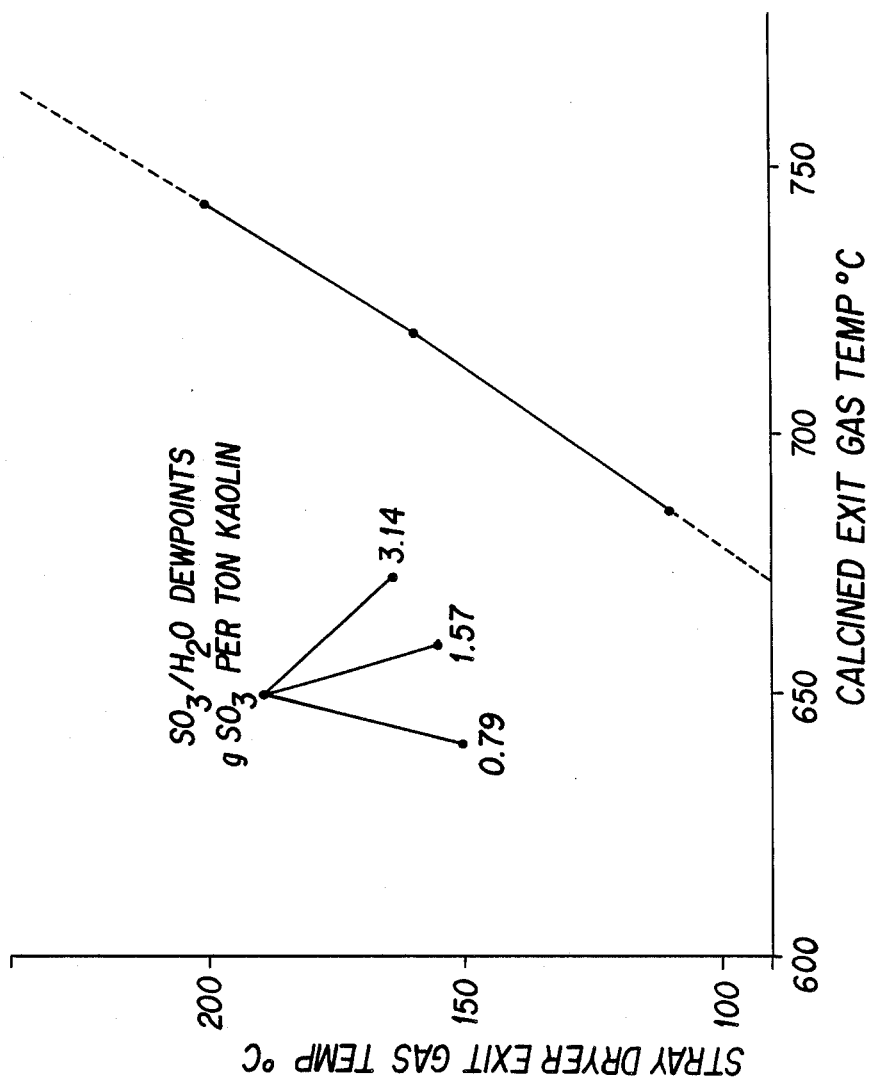
FIG. 3 is a graph illustrating the relationship between the temperature of the exit gases from the calciner and the temperature of the exit gases from the spray dryer.

FIG. 3 is a graph illustrating the relationship between the temperature of the exit gases from the calciner and the exit gas from the spray drier in a typical integrated spray drying calcining process which is in balanced operation. Also shown in FIG. 3 are the dew points of 148° C., 153° C. and 160° C. for systems containing 0.79, 1.57 and 3.14 kg of $SO_3$ per ton of kaolin calcined in relation to calciner exit gas temperature and spray drier exit gas temperature. It is apparent from FIG. 3 that for all practical purposes, operation under conditions wherein the exit gases from the calciner are at a temperature of 700°–800 C. and the exit gases from the spray drier are at 130°–250°C., depending on the amount of $SO_3$ present, is adequate to prevent the formation of significantly harmful amounts of sulfuric acid within the system.

What is claimed is:

1. A method for inhibiting spray drier and calciner corrosion in an integrated spray drying and calcining process in which the hot exit gas from the calciner are used to supply heat to the spray drier, which comprises passing a kaolin slurry to the spray drier, spray drying the kaolin slurry in the spray drier, passing the spray dried kaolin to the calciner, calcining the spray dried kaolin in the calciner, and passing the hot exit gases from the calciner to the spray drier, while maintaining said hot exit gases from the calciner at a temperature of 700°–800° C.

2. A method according to claim 1, wherein spray drier exit gases are at 130°–250° C.

3. A method for inhibiting the formation of sulfuric acid in equipment in an integrated spray drying and calcining process in which the hot exit gas from the calciner are used to supply heat to the spray drier, which comprises passing a kaolin slurry to the spray drier, spray drying the kaolin slurry in the spray drier, passing the spray dried kaolin to the calciner, calcining the spray dried kaolin in the calciner, and passing the hot exit gases from the calciner to the spray drier, while maintaining said hot exit gases from the calciner at a temperature of 700°–800° C.

4. A method according to claim 3, wherein spray drier exit gases are at 130°–250° C.

* * * * *